May 23, 1967 M. O. FELIX 3,321,585

LUBRICATING DEVICE FOR MAGNETIC TAPE AND TRANSDUCING HEADS

Filed Oct. 24, 1962 3 Sheets-Sheet 1

MICHAEL O. FELIX
INVENTOR.

BY Robert S. Clay

ATTORNEY

MICHAEL O. FELIX
INVENTOR.

BY Robert G. Clay

ATTORNEY

May 23, 1967 M. O. FELIX 3,321,585

LUBRICATING DEVICE FOR MAGNETIC TAPE AND TRANSDUCING HEADS

Filed Oct. 24, 1962 3 Sheets-Sheet 3

MICHAEL O. FELIX
INVENTOR.

BY Robert G. Clay

ATTORNEY

United States Patent Office 3,321,585
Patented May 23, 1967

3,321,585
LUBRICATING DEVICE FOR MAGNETIC TAPE AND TRANSDUCING HEADS

Michael O. Felix, San Carlos, Calif., assignor to Ampex Corporation, Redwood City, Calif., a corporation of California Filed Oct. 24, 1962, Ser. No. 232,851
6 Claims. (Cl. 179—100.2)

This invention relates to means for lubricating the engagement of a magnetic tape and its transducing heads, particularly without destroying the frictional engagement between the tape and its driving capstan.

In the magnetic tape transport art, the frictional rubbing action between the tape and its transducing heads causes wear and eventual destruction of both tape and heads. In wide-band or television tape machines, employing heads that rotate transversely to the direction of tape movement, repeated engagement of a head with a particular transverse track of the tape can cause destruction of the oxide surface in approximately 500 passes. The head itself may wear to the point of uselessness in approximately 300 hours.

It has long been contemplated to interpose a lubricant between the tape and head, but previous attempts have fallen short of practical success for two reasons:

First, it is difficult to introduce a sufficiently small amount of lubricant between the head and tape. If too much lubricant is introduced, the head and tape are spaced apart and signal strength is lost. A spacing of one millionth of an inch can cause a loss of approximately 1 decibel, for example, and it has been observed in practice that a single drop of sperm oil applied to a rotating head causes complete loss of signal for a substantial period, although eventually the oil is worn away to the degree that the signal comes through without complete loss of lubrication. It is apparent that a very thin, perhaps monomolecular, layer of lubricant provides sufficient lubrication without loss of signal. However the application of oil drop by drop has been found to be too gross a process to provide a layer that is immediately thin enough for this purpose.

Second, the tape in a transport is usually driven by a capstan and pinch roller assembly located downstream on the tape path from the transducing heads. If too much lubricant is introduced between the head and tape, then too much of the lubricant remains on the tape and causes slippage at the capstan, destroying the precise metering and speed control effect that the capstan is intended to provide. Even though the capstan is applied to the back side of the tape, opposite to the lubricated oxide surface, this disadvantage persists because upon repeated winding and rewinding of the tape in coils, substantially half the lubricant is transferred to the originally unlubricated tape face.

Accordingly, it is an object of the present invention to provide an apparatus for introducing a lubricant between a tape and transducing head in a sufficiently thin layer not to interfere with the transmission of signals between the head and tape.

It is another object of the invention to provide an apparatus as above described and functioning to limit the amount of lubricant remaining on the tape at the capstan so as not to cause slippage at the capstan.

An apparatus constructed in accordance with the invention includes means for introducing lubricant, either as a flow or spray of volatile fluid, or as a lubricant dispersed in a flow or spray of volatile fluid, between the head and tape, and means for spacing the contact zones of the tape and head and of the tape and capstan sufficiently far from the point of application that a portion of the fluid volatilizes before reaching these zones. Thus the layer of lubricant remaining on the tape is sufficiently thin to avoid degrading the signal or causing capstan slippage.

Further objects and advantages together with a better understanding of the invention may be had by reference to the following description, taken in conjunction with the accompanying drawings, in which.

Figure 1:
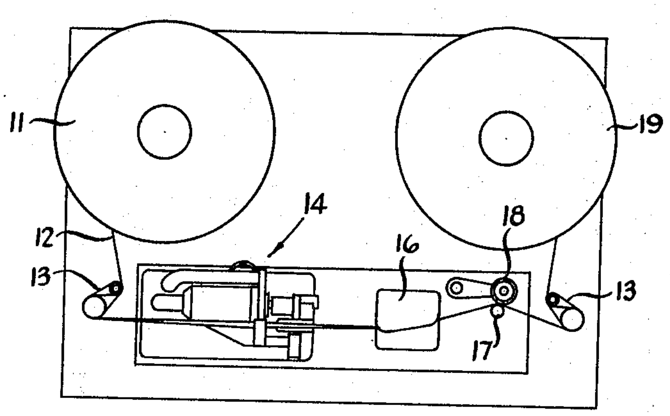
FIGURE 1 is a plan of a magnetic tape recording and reproducing machine embodying the invention.

Referring now to the drawings and particularly to FIGURE 1 thereof, there is shown a magnetic tape television recording and reproducing machine substantially similar to that described in U.S. Patent No. 3,020,359 "Tape Transducing Apparatus," by Robert F. Pfost. The basic machine includes a supply reel 11, a tape 12, a pair of tensioning guides 13, a rotary head assembly 14, a longitudinal head assembly 16, a capstan 17, a pinch roller 18, and a takeup reel 19. The tape 12 is drawn by the capstan 17 from left to right as seen in the figure, past the head assembly 14.

Figure 2:
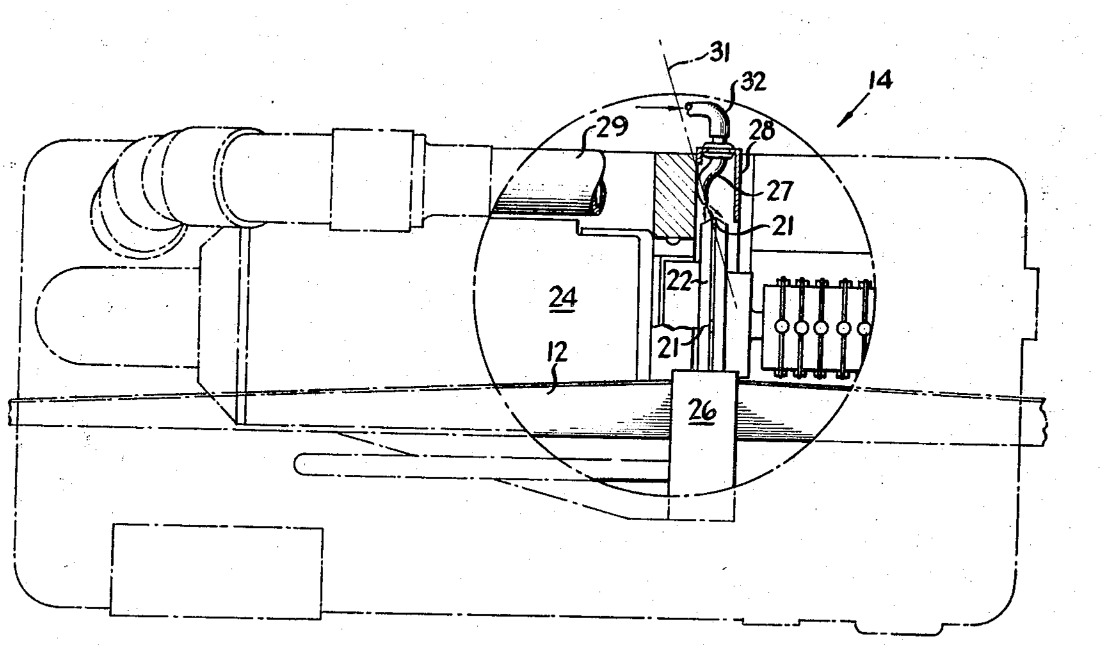
FIGURE 2 is an enlarged and broken-away plan, partly in phantom, of a portion of the apparatus of FIGURE 1.

As shown in FIGURE 2, novel structure is provided to supply lubrication for reducing the frictional wear between the tape 12 and heads 21, which are mounted for rotation on a drum 22, the latter being mounted on a shaft (not shown) extending from a motor 24. The tape is cradled in a female guide member 26. Confronting the side of the drum opposite guide 26, there is mounted a nozzle 27 for spraying fluid lubricant onto the heads as they pass in rotation. The nozzle is mounted in the wall of a shield 28 that defines a chamber around the head drum, from which chamber the air is continuously evacuated by means of a conduit 29 and air pump (not shown). The tip of the nozzle 27 is directed at an angle, illustrated by the dashed line 31, so that the spray from the nozzle strikes the head and head drum on the upstream side of the tape path. Thus it is ensured that some of the spray remaining on the drum and head will be trapped against the tape when the head encounters the tape. The fluid for forming the spray is supplied through a conduit 32 from a pressure source (not shown).

It is advantageous to the invention that the lubricating fluid be finely divided and dispersed, as in the spray referred to, in order that the density and thickness of the lubricant on the head be small. The spray itself may be created by mere natural dispersion of the fluid as it leaves the nozzle. However in the example illustrated, the flow of air out of the chamber 28 through vacuum conduit 29 assists this dispersion as by providing a venturi effect like that of an atomizer. Alternatively, an atomizer spray device, such as is well known in the art, may be used.

Figure 4:
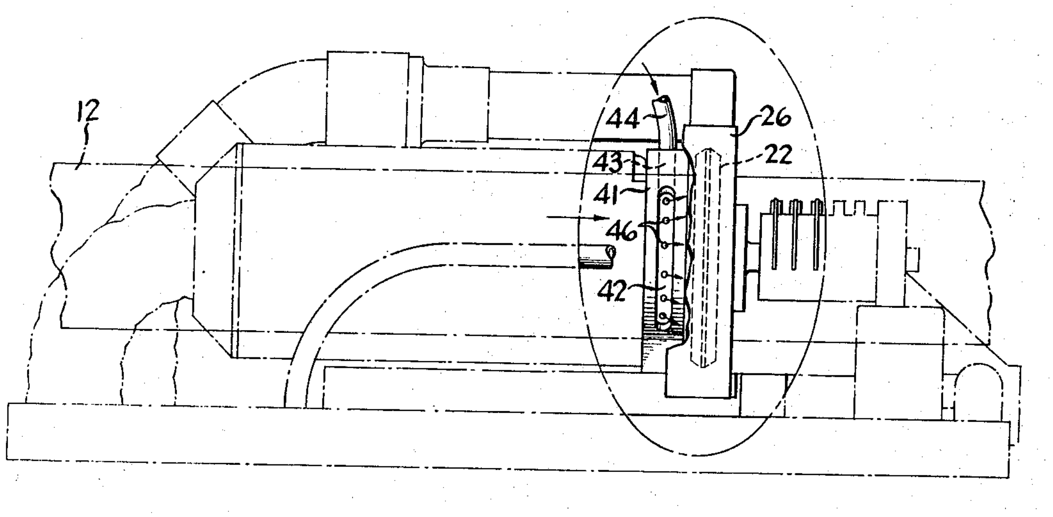
FIGURE 4 is a broken-away side elevation, partly in phantom, of a portion of an apparatus similar to that of FIGURE 2 but showing a variation of the invention.
Figure 3:
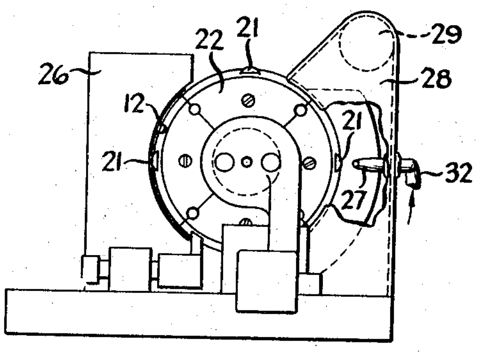
FIGURE 3 is a broken-away end elevation of the apparatus shown in FIGURE 2.
Figure 5:
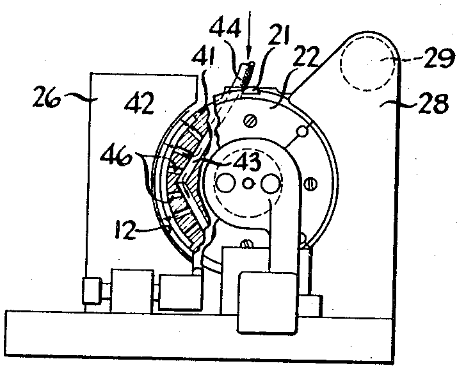
FIGURE 5 is a broken-away end elevation of the apparatus of FIGURE 4.

An alternative arrangement for supplying the spray is shown in FIGURES 4 and 5. Instead of being supplied to the head before its contact with the tape, the spray in this arrangement is supplied to the tape before its contact with the head. A solid frame member 41, forming part of the basic machine and located immediately upstream on the tape path from the head drum 22, is relieved on the side facing the tape to define an elongated recess 42 transverse to the tape length. An interior channel 43 communicates with a supply hose 44 and laterally with the recess 42 as by means of radially directed passages 46. The purpose of the recess 42 is to space the orifices of the passages 46 from the tape, so that the spray coming from the orifices is distributed evenly over the width of the tape.

Figure 6:
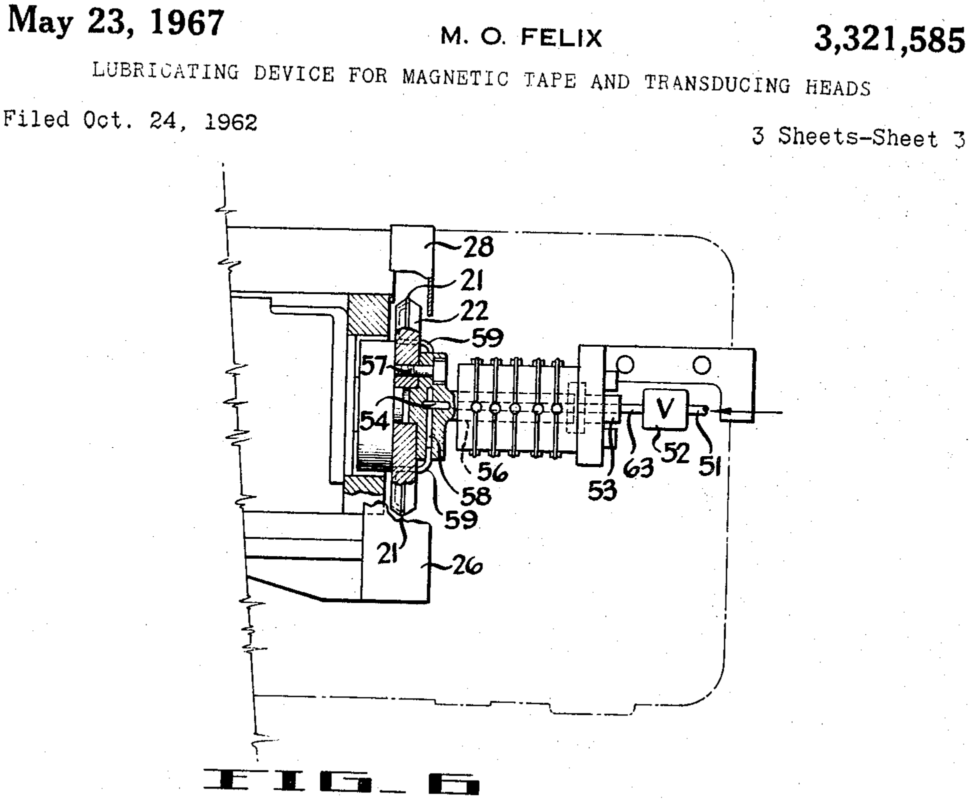
FIGURE 6 is an enlarged and broken-away plan, partly in phantom, of a portion of an apparatus similar to that of FIGURE 1, and showing a variation of the invention.
Figure 7:
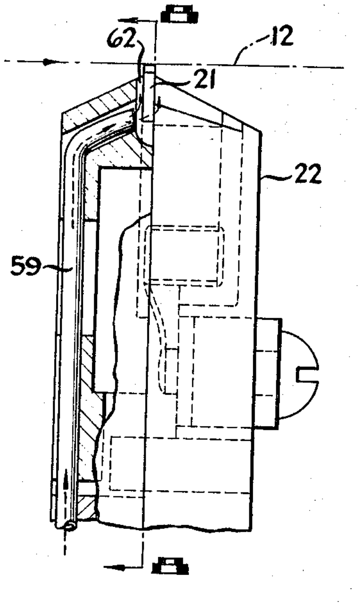
FIGURE 7 is a further enlarged and broken-away plan of a portion of the apparatus of FIGURE 6.
Figure 8:
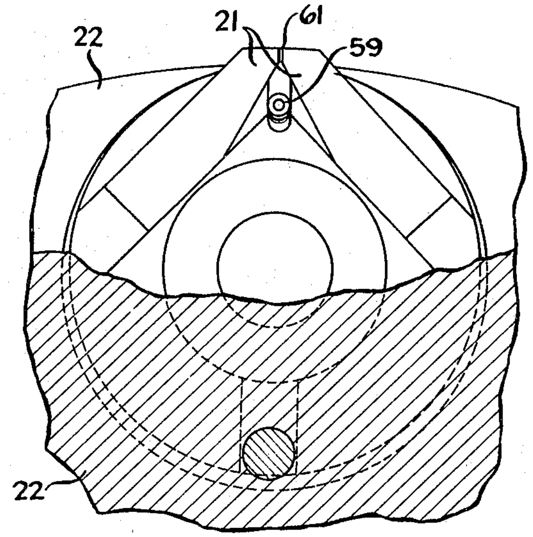
FIGURE 8 is a section taken substantially on the plane of lines 8—8 of FIGURE 7.

Another alternative arrangement is shown in FIGURE 6. In this arrangement the fluid is supplied directly to the head and tape in the zone of contact as by means of a supply conduit 51, a flow regulating valve 52, a revolving sealed joint 53 of a type well known in the art, and an axial passage 54 formed in a shaft extension 56 that is attached to the rotating head drum 22 as by bolts 57. From the passage 54 a number of radial passages 58 communicate with radial conduits 59 leading to the heads 21. As shown in FIGURES 7 and 8, each conduit 59 terminates on the upstream side of the corresponding head 21 and at a point just behind the head gap 61, so that the fluid can flow around both sides of the head to the tape 12. A relieved passage 62 is provided on the upstream side of the head to accommodate a portion of the fluid flow. Also, an air hole 63 may be formed in the conduit 53 near the valve 52.

In the last arrangement above described, the fluid may be controlled as by the valve 52 to issue, not as a spray, but rather as a thin film of fluid wetting the surface of the head 21. The centrifugal action of the rotating drum causes continuous outward migration of this film along the interior surfaces of the passages 58 and conduits 59, and air entering the hole 63 is pumped through the passage 54 and outward to the heads by the same centrifugal action, helping to move the fluid in the non-rotating conduit 53.

In all of the arrangements above described, the lubricant may be either wholly constituted by a volatile fluid, or may be a non-volatile lubricant dispersed in a volatile fluid or in a saturated vapor. If a volatile fluid alone is used, the rate of flow and the distance traveled by the fluid in the presence of air to the zone of engagement of tape and head are carefully established so that the amount that actually arrives at this zone without volatizing is just the right amount to provide good lubrication without degrading the signal. For example, in FIGURES 2 and 4, the fluid is dispersed and partly vaporized in the spray from nozzles 27 and 46 respectively, and the portions of fluid actually arriving at the head 21 (FIGURE 2) or tape 12 (FIGURE 4) are further vaporized before reaching the contact zone. In the example of FIGURE 6, the air flowing in conduits 54, 58 and 59 causes partial vaporization before the fluid arrives at the zone of contact. In effect, the structure makes it possible to use fluid of sufficient concentration and body to be handled by the supply means, and yet distributes this fluid to the heads in sufficiently small quantities to serve the desired purpose.

Also, when the lubricant is entirely composed of volatile fluid, the capstan is spaced sufficiently far from the head to permit substantially total vaporization of the fluid on the tape before reaching the capstan.

The use of a volatile fluid also makes possible the application of non-volatile lubricants in the thinly dispersed form desired. The lubricant is first dispersed and mixed or dissolved in the volatile fluid and then sprayed or centrifugally pumped as in the structures described above, during which process the volatile fluid may be partially or entirely vaporized, leaving only the very thinly dispersed lubricant in the zone of contact between tape and head. The parameters of the system are adjusted to provide an amount of residual lubricant that is less than would degrade the signal or cause slippage at the capstan. In this arrangement, it may be said that the lubricant is supplied in the thin dispersion desired, and is mixed with the volatile fluid to give it sufficient body to be handled in the supply means.

Examples of volatile fluids suitable for use in the present invention are carbon tetrachloride and members of the Freon family selected for volatilization at the temperature and pressure conditions existing in the environment in which the invention is to be used. Examples of lubricants that may be dispersed in the fluid are sperm oil and molybdenum disulfide, the latter in colloidal suspension.

While the apparatus has been described in relation to a rotary head magnetic tape machine, it will be apparent that the invention, and particularly the arrangements shown in FIGURES 5 and 8, may be applied to fixed-head machines without departing from the spirit of the invention.

Thus there has been described a head-tape lubricating apparatus including means for introducing lubricant, either as a flow or spray of volatile fluid, or as a lubricant dispersed in a flow or spray of volatile fluid, between the head and tape, and means for spacing the contact zones of the tape and head and of the tape and capstan sufficiently far from the point of application that a portion of the fluid volatizes before reaching these zones. Thus the layer of lubricant remaining on the tape is sufficiently thin to avoid degrading the signal or causing capstan slippage.

What is claimed is:

1. Apparatus for use with a magnetic tape recording and reproducing machine of the type wherein a tape is moved by a capstan past a transducing head located upstream from said capstan, comprising:
   - a volatile liquid;
   - means for applying said volatile liquid to and between the engaged surfaces of said head and tape in a concentration less than would destroy the transducing action of said head with resect to said tape; and
   - means for spacing said head from said capstan for a space sufficient to ensure that the unvolatilized liquid remaining on said tape at said capstan has a concentration less than would cause slippage between said tape and capstan.

2. Apparatus for use with a magnetic tape recording and reproducing machine of the type wherein a tape is moved by a capstan past a transducing head located upstream from said capstan, comprising:
   - a fluid composed of a lubricant dispersed in a volatile liquid;
   - means for applying said fluid to and between the engaged surfaces of said head and tape in a concentration less than would destroy the transducing action of said head with repsect to said tape; and
   - means for spacing said head from said capstan for a space sufficient to ensure that the unvolatilized fluid remaining on said tape at said capstan has a concentration less than would cause slippage between said tape and capstan.

3. Apparatus for use with a magnetic tape recording and reproducing machine of the type wherein a tape is moved by a capstan past a transducing head located upstream from said capstan, comprising:
   - a volatile liquid;
   - means for directing said volatile liquid in a spray onto said tape at a point upstream from said transducing head;
   - means for spacing said spray means from said tape and from said head for a first space sufficient to ensure that the unvolatilized liquid remaining on said tape at said head has a concentration less than would destroy the transducing action of said head with respect to said tape; and
   - means for spacing said head from said capstan for a second space sufficient to ensure that the unvolatilized liquid remaining on said tape at said capstan has a concentration less than would cause slippage between said tape and capstan.

4. Apparatus for use with a magnetic tape recording and reproducing machine of the type wherein a tape is moved by a capstan past a transducing head located upstream from said capstan, comprising:

a fluid composed of a lubricant dispersed in a volatile liquid;

means for directing said fluid in a spray onto said tape at a point upstream from said transducing head;

means for spacing said spray means from said tape and from said head for a first space sufficient to ensure that the unvolatilized fluid remaining on said tape at said head has a concentration less than would destroy the transducing action of said head with respect to said tape; and means for spacing said head from said capstan for a second space sufficient to ensure that the unvolatilized fluid remaining on said tape at said capstan has a concentration less than would cause slippage between said tape and capstan.

5. Apparatus for use with a magnetic tape recording and reproducing machine of the type wherein a tape is moved by a capstan past a plurality of rotating transducing heads located upstream from said capstan, comprising:

a volatile liquid;

means for directing said volatile liquid in a spray onto each of said transducing heads before said head comes into engagement with said tape;

means for spacing said spray means from said head and from said tape for a first space sufficient to ensure that the unvolatilized liquid remaining on said tape at said head has a concentration less than would destroy the transducing action of said head with respect to said tape; and means for spacing said heads from said capstan for a second space sufficient to ensure that the unvolatilized liquid remaining on said tape at said capstan has a concentration less than would cause slippage between said tape and capstan.

6. Apparatus for use with a magnetic tape recording and reproducing machine of the type wherein a tape is moved by a capstan past a transducing head located upstream from said capstan, comprising:

a fluid composed of a lubricant dispersed in a volatile liquid;

means for directing said fluid through said head and onto said tape between the engaged surfaces of said head and tape;

means for regulating the flow rate of said fluid so as to limit said fluid between said head and tape to a concentration less than would destroy the transducing action of said head with respect to said tape; and means for spacing said head from said capstan for a space sufficient to ensure that the unvolatilized fluid remaining on said tape at said capstan has a concentration less than would cause slippage between said tape and capstan.

References Cited by the Examiner

UNITED STATES PATENTS

| | | | |
|---|---|---|---|
| 2,426,838 | 9/1947 | Miller | 179—100.2 |
| 2,612,566 | 9/1952 | Anderson et al. | 179—100.2 |
| 2,642,722 | 6/1953 | Vaughn | 184—1 |
| 2,664,173 | 12/1953 | Karig | 184—1 X |
| 2,841,244 | 7/1958 | Sorem | 184—1 |
| 3,060,431 | 10/1962 | Fuller et al. | 346—74 |

BERNARD KONICK, *Primary Examiner.*

J. BREIMAYER, *Assistant Examiner.*